Figure 1:
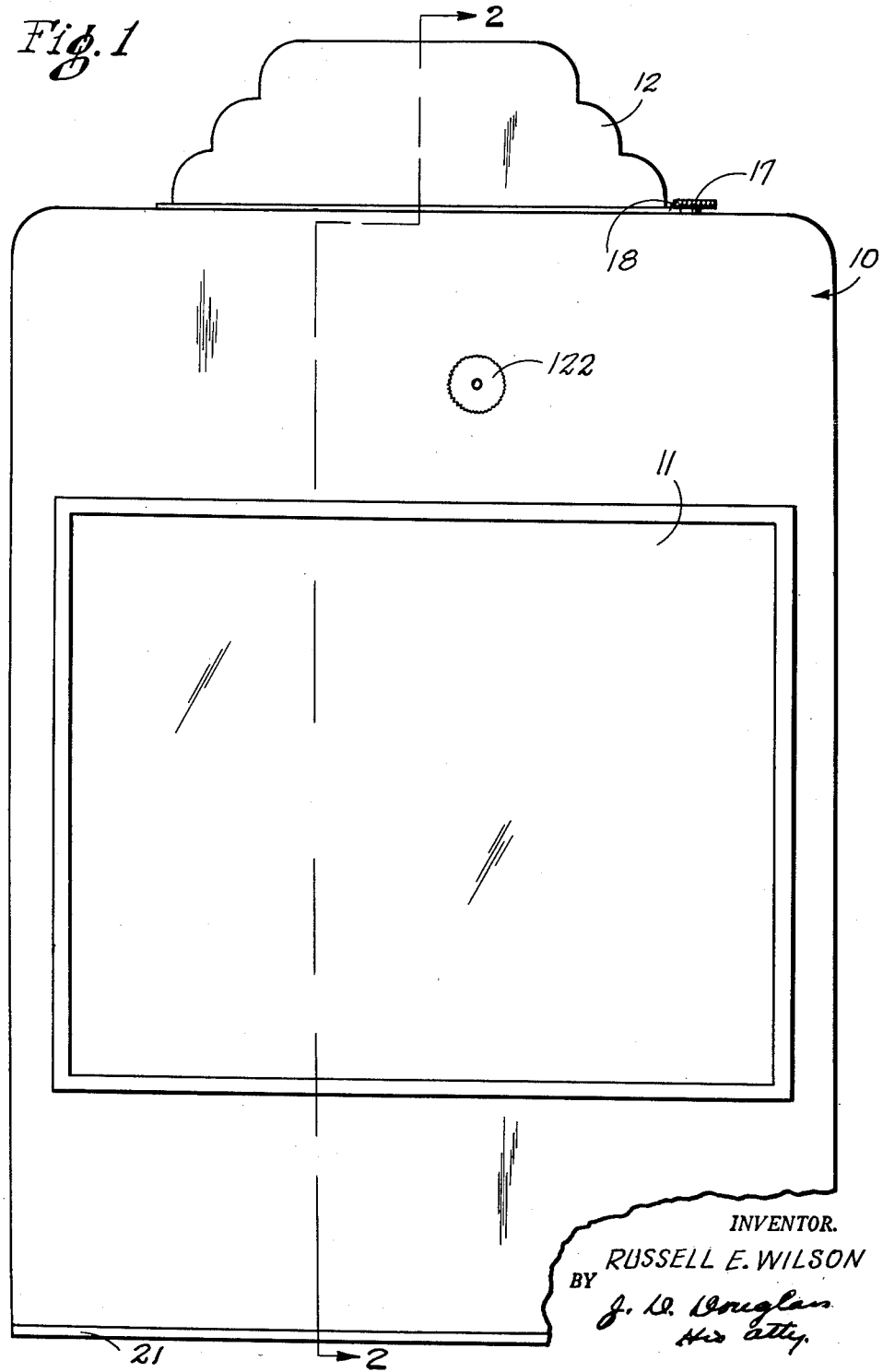

March 22, 1955 R. E. WILSON 2,704,486
ENDLESS CHAIN SLIDE PROJECTOR
Filed April 28, 1951 6 Sheets-Sheet 1

INVENTOR.
RUSSELL E. WILSON
BY J. D. Douglas
His atty.

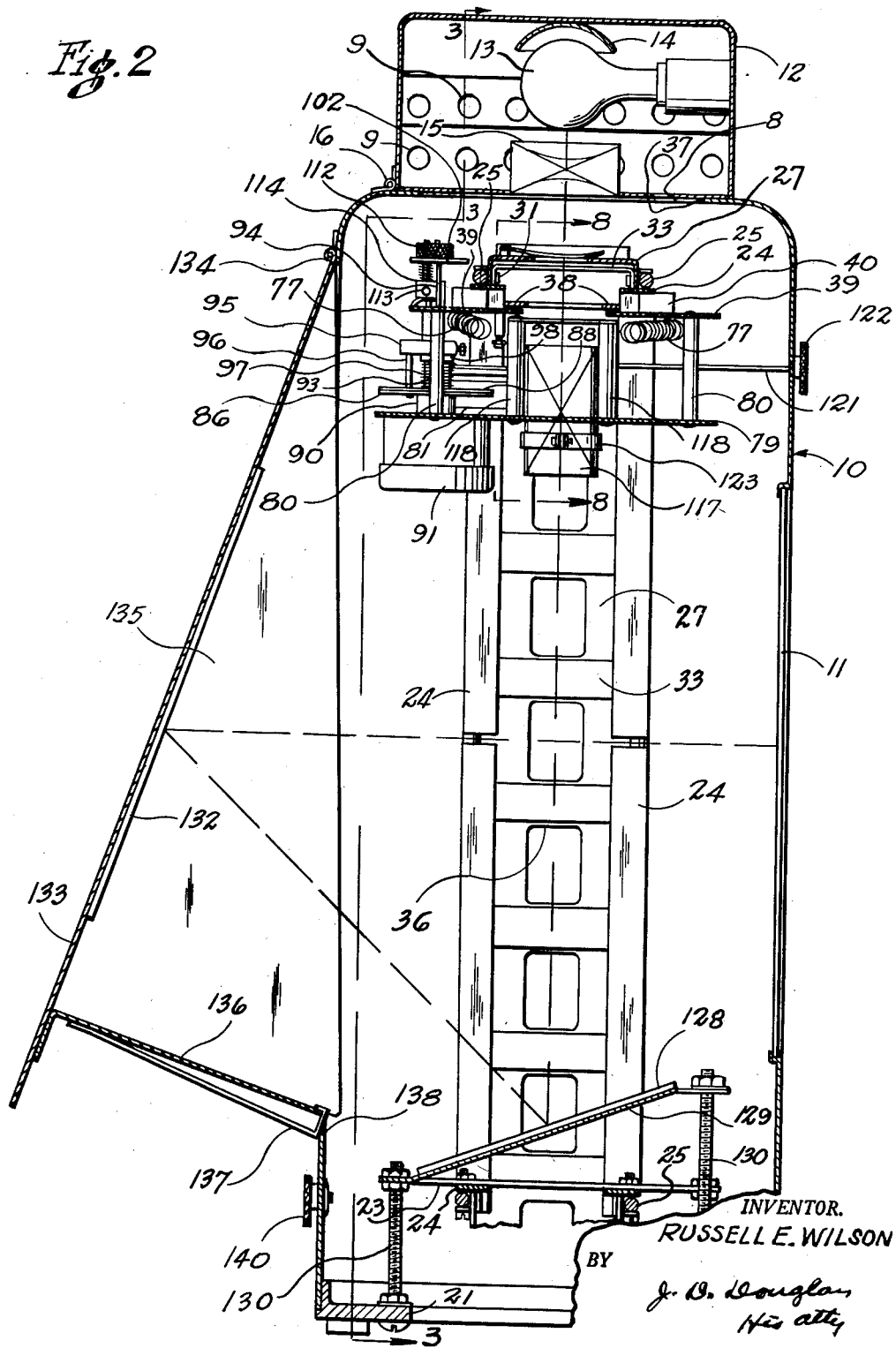

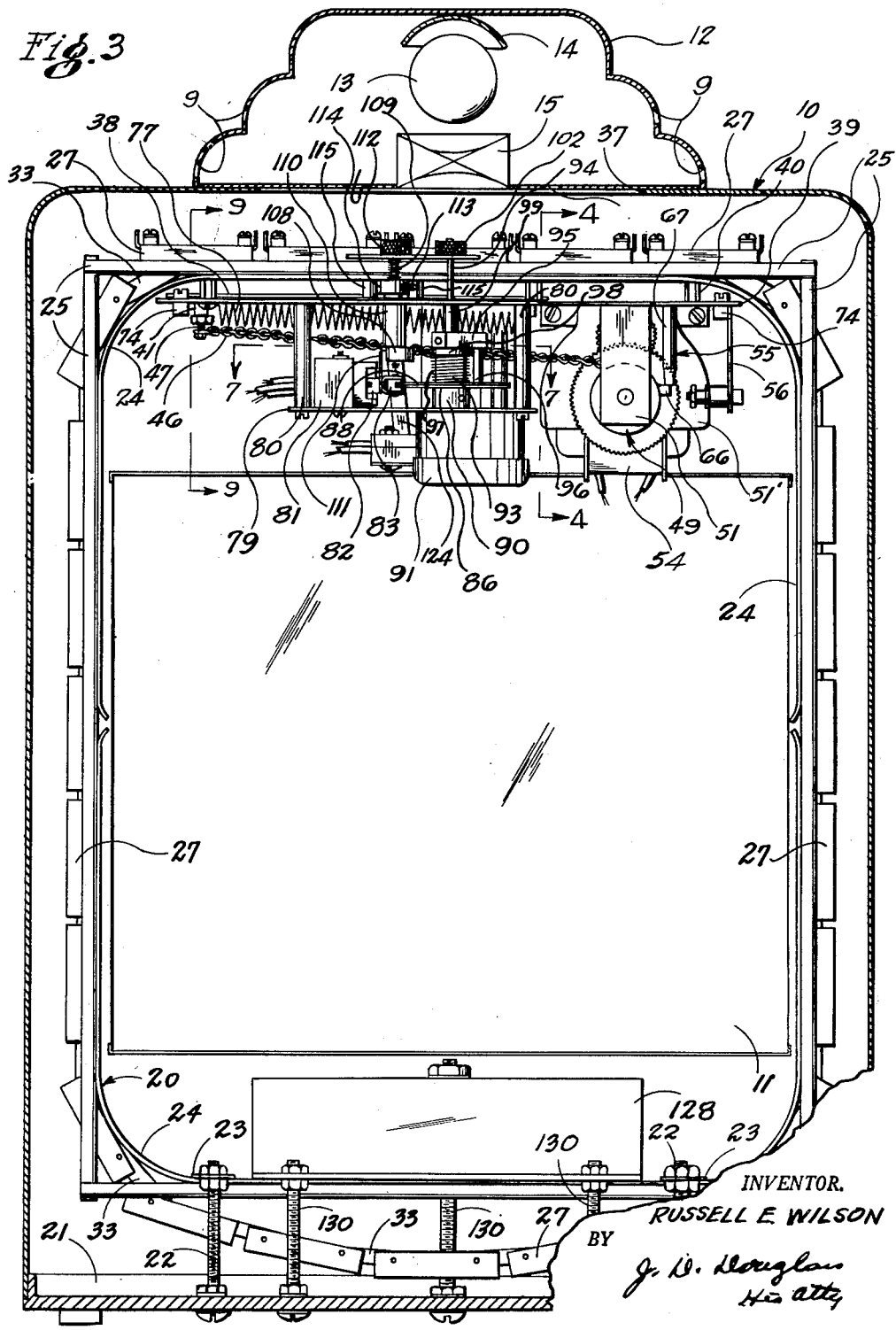

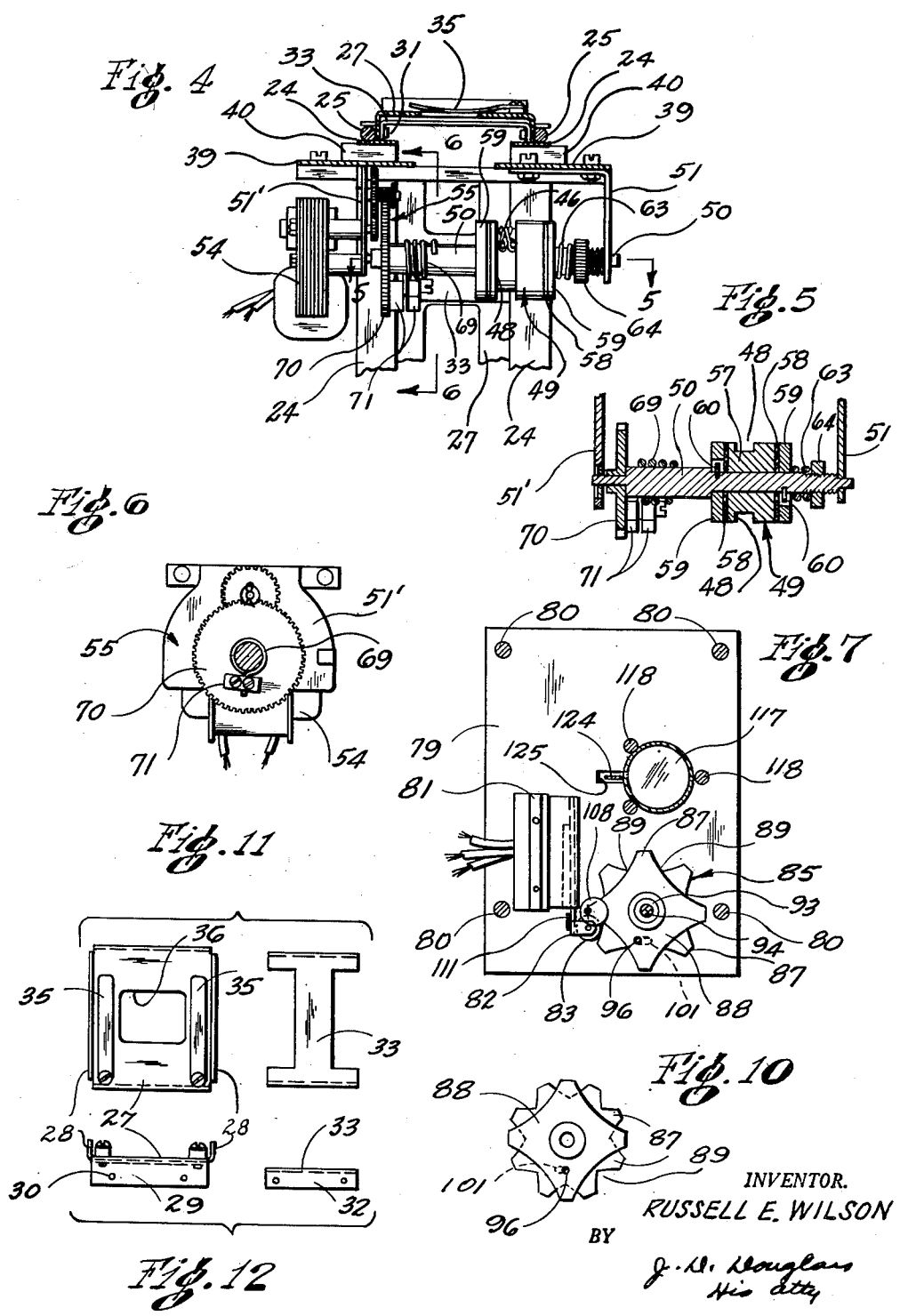

March 22, 1955 R. E. WILSON 2,704,486
ENDLESS CHAIN SLIDE PROJECTOR
Filed April 28, 1951 6 Sheets-Sheet 5
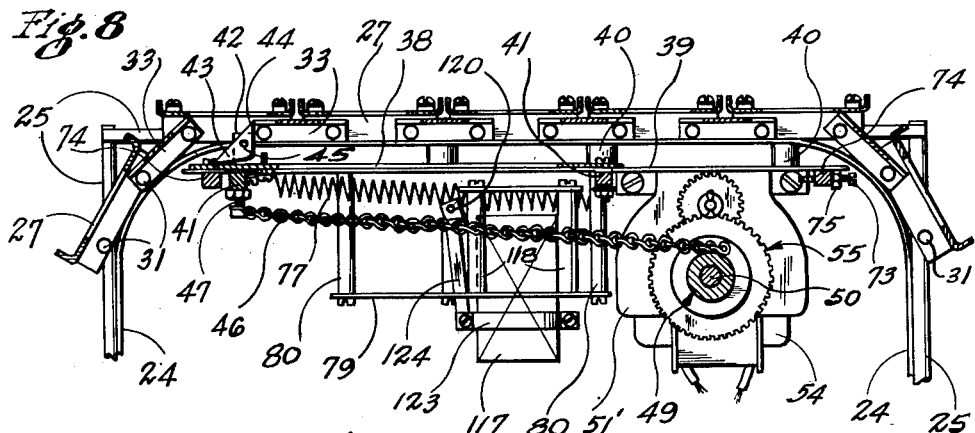
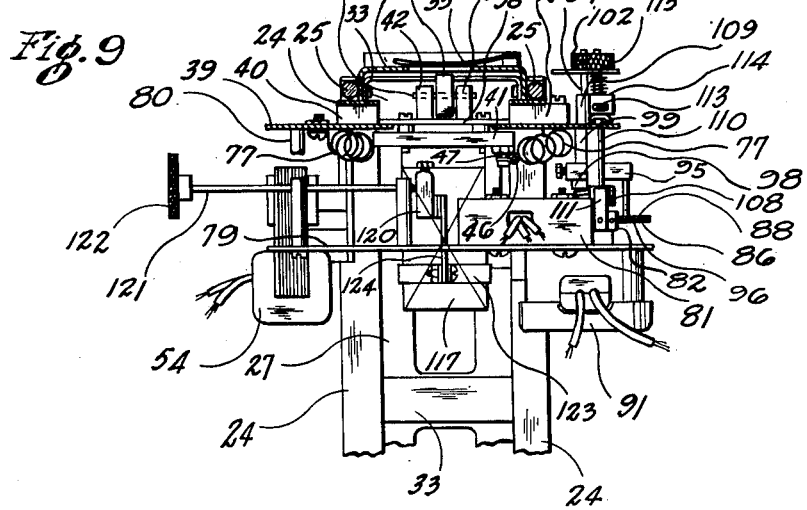
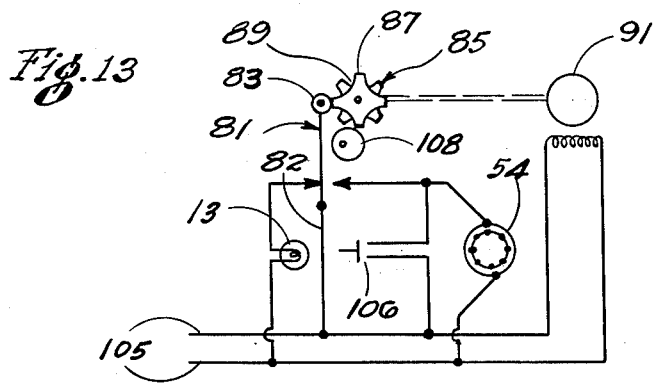
INVENTOR.
RUSSELL E. WILSON
BY J. D. Douglas
His atty March 22, 1955 R. E. WILSON 2,704,486
ENDLESS CHAIN SLIDE PROJECTOR
Filed April 28, 1951 6 Sheets-Sheet 6

INVENTOR.
RUSSELL E. WILSON
BY J. D. Douglas
His atty

United States Patent Office 2,704,486
Patented Mar. 22, 1955

2,704,486

ENDLESS CHAIN SLIDE PROJECTOR

Russell E. Wilson, Cleveland, Ohio

Application April 28, 1951, Serial No. 223,515

16 Claims. (Cl. 88—28)

This invention pertains to slide projectors, and more particularly to a self-contained projection and screen unit having an automatic drive adapted to change slides automatically and one which is readily portable.

Automatic, self-contained slide projectors are very useful as advertising and display devices. However, previous projectors of this type have been large and clumsy or else have been able to show so few slides that they were not practical. Other devices have required the use of film strips. Film strips, however, have the disadvantage of requiring complete replacement or a tedious splicing operation whenever it is desired to change a few pictures.

By my invention, I provide a self-contained projector of small size and still having an adequate screen. In addition, the device contains a large number of standard sized slides, each of which may be readily changed if desired. The automatic drive is a simplified device which changes pictures at predetermined intervals. The timed intervals may also be readily changed. During the change cycle, the screen is left completely dark until the next picture is positioned. Thus, for the short period during the changing of the slide, instead of a blurred picture of two moving slides, the screen is dark and there is no eye strain. In addition, and particularly useful for classroom or training lectures and demonstrations, I provide a system which allows a manual operation of the drive in response to operation of a switch by the instructor or lecturer.

These features are obtained by a machine which is less expensive than those of the prior art because of the simplified escapement and timing mechanism which is at the same time adequate for the requirements. A chain of slide holders is provided, extending around the screen, thus allowing the longest possible chain of slides. The light source is above this chain in a separate compartment. Thus, heat from this source is isolated from the slides. This light source is conveniently placed on the top of the cabinet, and as a result the whole projector is cooler. Many other advantages of my invention, and the invention itself, will become apparent from reference to the following description and drawings which form a part of this specification.

Figure 14:
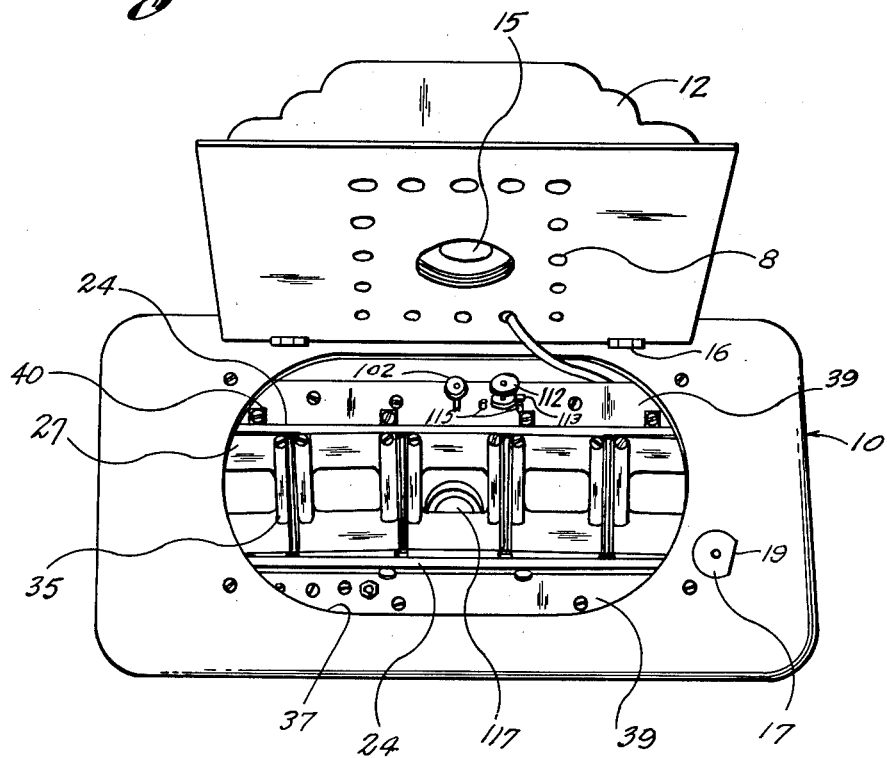

Fig. 1 is a front elevational view of my projector;
Fig. 2 is a sectional view along line 2—2 of Fig. 1;
Fig. 3 is a sectional view from line 3—3 of Fig. 2;
Fig. 4 is a detailed sectional view from line 4—4 of Fig. 3;
Fig. 5 is a longitudinal sectional view of the drive shaft and pulley from line 5—5 of Fig. 4;
Fig. 6 is a detailed view of the motor and drive shaft from line 6—6 of Fig. 4;
Fig. 7 is a top plan view of the mounting plate from line 7—7 of Fig. 3;
Fig. 8 is a detailed sectional view from line 8—8 of Fig. 2;
Fig. 9 is a detailed view from line 9—9 of Fig. 3;
Fig. 10 is a detailed plan view of the cam in a long-delay position;
Fig. 11 is an exploded plan view of one unit of the slide chain separate from its surroundings;
Fig. 12 is an exploded elevational view of the unit of Fig. 11;
Fig. 13 is a wiring diagram of the electrical system of the projectors; and
Fig. 14 is a top plan view partly in perspective of the projector with the lamp housing tilted back.

Briefly, my invention comprises a self-contained projection system of an improved design. From a lamp house atop the case, the light projection is down through the picture transparency, then through the object lens and a system of mirrors to a screen on the front of the case. A chain of slide carriers is provided running around the maximum dimension of the case providing for a comparatively large number of slides. A simplified escapement mechanism moves the slides at timed intervals. By a cam arrangement the timing of these intervals can be varied so as to provide for alternate viewing times for the slides. A remote control of the slide changing mechanism by manual operation of a switch is also provided.

More specifically, and referring to the drawings, my invention is embodied in a projector enclosed in a case 10 of generally rectangular shape. On the front of the case, a translucent screen 11 is provided onto which the picture is projected. At the top, the case is provided with a lamp housing 12 which contains the projection lamp 13, a reflector 14 and a condensing lens system 15. This housing is perforated on the sides at 9 (Fig. 2) for ventilation and cooling. A fan for cooling may be provided, but is not necessary in the smaller sizes where a 100 to 150 watt projection bulb is adequate. The housing 12 is hinged to the case 10 at 16 and can be tilted back to uncover the slides as best shown in Fig. 14. Ventilating holes 8 are also provided in the bottom part of the lamp housing to allow free circulation of the air. The housing 12 may be held down by the engagement of the flange on a flanged knob 17 with a flange 18 on the housing (Fig. 1). The flange of the knob 17 is cut away at one location 19 to allow the flange 18 to pass, and then by turning the knob, the housing 12 is held.

Within the main housing 10 is mounted the mechanism for carrying and changing the slides as well as the projection mirrors. The former mechanism is mounted on a framework 20 supported from a base 21 by bolts 22 (Fig. 3). The bolts support cross members 23 of the frame to which the flat track members 24 and the framing rods 25 are bolted. The rods 25 form a rectangular frame around the screen 11 within the case. The track members 24 are fixed to the rods at intervals by spot welding, screws or the like (not shown), and are shaped with rounded corners so that the chain may pass easily thereover. The track members are fixed to the inner side of the rods so that the rods will serve as lateral guides for the chain.

The chain of slide holders is made up of a series of links as best shown in Figs. 11 and 12. Each carrier 27 is formed with a pair of opposite upturned flanges 28 and a pair of down turned flanges 29. The down-turned flanges are provided with a hole 30 in which a rivet 31 (Fig. 8) is journalled. This rivet also extends through the down turned flange 32 of a linking member 33. This latter member is roughly I-shaped, and the flanges 32 are considerably shorter than the flanges 29 on the carrier member 27 so that free pivoting of the link 27 is provided. The carrier also is equipped with two leaf springs 35 spaced on either side of the central opening 36. The springs 35 hold the slides in place in the carrier where they are additionally protected by the flanges 28. These links are combined together to form a complete chain capable of a sliding motion on the track members 24. As best shown in Fig. 3, the chain may be quite loosely disposed on the track and sag somewhat at the bottom without interfering with the operation of the devices. Loading and unloading of slides from the carriers may be readily accomplished by tilting the housing 12 back on its hinge 16. This exposes the chain of carriers at its upper rim, and slides may be placed therein through the opening 37 in the top of the case 10 (Fig. 14).

The chain is pulled around the track, one frame at a time by sliding escapement mechanism near the top of the case. This escapement, as best shown in Figs. 8 and 9 comprises a carriage formed of a plate 38 slidably disposed on a carriage track member 39 suspended from the tracks 24 and spaced therefrom by blocks 40. The plate is held on the track member 39 by a pair of bars 41 bolted to the plate 38 beneath the tracks 39 and spaced from the track member by suitable spacers to allow the carriage to slide easily. A pair of upright members 42 are fixed to the plate 38 at one end, and support a triangular shaped pawl 43 between them. The pawl 43 is freely journalled on a pin 45 extending between the uprights. The upper corner 44 of the pawl 43 extends upward so that it will engage the edge of the linking member 33. Thus, as the carriage is moved to the right (Fig. 8), the pawl moves the chain because of the engagement of the point 44 with the link 33. Movement to the left, however, will cause the pawl to rock on its pin and, therefore, no movement of the chain will result.

The carriage is moved in one direction by a motor which winds a chain on a pulley, and is pulled back by a spring system. Safeguards to protect the parts are also provided. Specifically, a chain 46 is fixed to a post 47 which may take the form of a screw threaded into one of the bars 41. At its other end, the chain is pinned in the groove 48 of an over-running pulley 49 (Fig. 4). The pulley in turn is driven by a shaft 50 journalled in two brackets 51 and 51' suspended from the track member 39. The bracket 51' also supports the motor 54 which drives the shaft 50 through a speed reducing gear train 55. The motor may also have additional support provided by a side bracket 56 (Fig. 3) if desired.

Two safety devices are provided in this drive, although either one alone might be sufficient. As noted above, the pulley 49 is capable of over-running. The construction of this pulley is best shown in Fig. 5. It will there be seen that the pulley is constructed of a center drum 57 which is free to rotate on the shaft 50. On each side of the drum, a felt or fiber washer 58 is pressed against the drum by a metal washer 59. These metal washers 59 are driven positively by the shaft 50 through pins 60 engaged in keyways formed in the washers. Thus the only drive of the pulley drum 57 is by friction through the washers 58. The amount of friction may be varied by varying the pressure applied to the washers 59. One of these washers is held against a shoulder in the shaft 50, and the other is engaged by a compression spring 63 surrounding the shaft 50. The pressure of the spring is regulated by a knurled nut 64 threaded on to a threaded part of the shaft 50. This nut is preferably a snug fit with the shaft in order to reduce the likelihood of its working loose because of the starting and stopping of the shaft. The spring 63 also serves to inhibit motion of the nut 64 because of the friction between the spring and the nut. Thus, the drive to the chain 46 is not positive but may be regulated by the pressure of the spring 63. This allows the motor to run for slightly longer than is necessary to move the slide holders one space, and assures a complete picture change without damage to the motor.

The second safety device allows the armature of the motor to be slowed to a stop in a reverse direction while the pulley is brought to a sudden stop. The pulley 49 is provided with a pin 66 (Fig. 3) projecting radially from the drum 57. A pin 67 extending downward from the track member 39 is in position to engage this pin 66 to stop the rotation of the pulley on the return stroke. This is an abrupt stop, and in order to avoid having to stop the motor armature as well as the pulley, a type of over-running clutch is provided which drives one way and not the other. This clutch comprises a wire spring 69 (Fig. 5) wound around the shaft 50 adjacent the last gear 70 of the gear train 55. This gear is journalled freely on the shaft 50. One end of the spring 69 is held between two blocks 71 fixed to the gear 70, and the other end is free on the shaft. The spring is wound snugly but not tightly around the shaft 50 in a direction so that when the gear 70 is driven in a direction to wind the chain 46 on its pulley 49, the spring tightens about the shaft and drives it. However, when on the reverse stroke, the inertia of the motor armature tends to rotate the gear in the opposite direction, the spring 69 loosens and will then slip on the shaft, thus avoiding sudden stops on the motor armature. It will be apparent to those skilled in the art that the pulley 49 could be adjusted to accomplish much the same effect as this spring clutch. However, slippage in the drive direction (winding the chain 46 on the pulley 49) should be kept to a minimum. Therefore, the pulley 49 is adjusted somewhat tighter than is desirable in the slowing of the inertia of the armature.

The principal reason why slippage should be minimized is to make certain that the change from one slide to another is completed in the limited time during which the motor 54 operates. The means controlling this time will be described hereinafter. In order to assure that the change of slides is stopped properly so that each picture is centered, an adjustable stop is provided. This stop is merely a bolt 73 (Fig. 8) threaded into one of two cross members 74 on the track member 38. This bolt is in position to engage the right hand (Fig. 8) cross bar 41 of the sliding carriage. A jam nut 75 may be used to keep the stop bolt 73 in its proper adjusted position. It will be seen that stopping the carriage at the proper spot has the effect of properly locating each carrier link 27 in a centered position beneath the condensing lens system 15 for proper projection.

As noted above, the motor 54 runs for a limited time to move the carriage and change one slide. At the end of this time, a switch, later to be described, breaks the electrical circuit to the motor and the carriage is free to return. This return is effected by a pair of tension springs 77, one on each side of the carriage. These springs are fastened, at one end (the left hand end in Figs. 3 and 8), to the under side of the track plate 39 and at the other end to the cross bars 41 of the carriage. Thus, as the motor pulls the carriage to the right in the figures, the springs are elongated and stressed. When the motor is turned off, the springs then return to their normal position, as shown in the figures, and pull the carriage back to a position where the pawl 43 can engage the next link 33 preparatory to changing the slide again.

Control of the motor 54 may be either manual or automatic. It will be obvious that any simple switch in the motor circuit could be used to control the motor. This switch could be located at a point remote from the projector and is particularly useful when the projector is utilized in a classroom or lecture demonstration. For use as an advertising display, however, an automatic control having a timed showing of a slide and then a change of slides is desirable. In the projector of my invention a simplified and effective device is used to provide this control.

The automatic control is mounted on a plate 79 suspended from the track plate 39 on posts 80 (Figs. 2, 3, 7, 8 and 9). The switch 81 of the control is mounted on this plate. This switch may be of any commercial variety having a spring biased operating member. The preferred switch is of the single-pole, double-throw type having a normally-open and a normally-closed set of contacts. The functions of these will be explained hereinafter with reference to the wiring diagram. The operating member of the preferred switch is an arm 82 (Figs. 3 and 8), terminating in a forked end wherein a roller 83 is journalled. This end of the arm is biased away from the main body of the switch.

Adjacent the roller 83 is a cam 85 of novel construction. This cam is composed of two plates; a lower plate 86 having eight lobes 87, and an upper plate 88 having four lobes of the same shape as the lobes on the eight lobed cam. These plates may conveniently be formed as circular plates from which V-shaped notches 89 are cut to form the lobes of the eight lobed plate. To form the four lobed plate then, alternate lobes of an eight lobed plate are removed (Figs. 7 and 10). The notches 89 must be wide enough so that the roller 83 will drop into them to cause the switch 81 to change its position for a sufficiently long time to accomplish the desired result. In the preferred embodiment, the lobes hold the switch operating member in a position where the motor 54 is inoperative. Therefore, the notches 89 must be broad enough to allow the switch to close its contacts for a time sufficient to pull the carriage completely to change the slides. It will be apparent that the operation could be reversed, and that the notch could be the inactive period of the motor while the lobe caused the motor to operate.

However, with my novel cam, the first described operation is preferred for reasons which will become apparent. The lower plate 86 of the cam is held in a fixed, rotative position on a collar 90 (Figs. 2 and 3) which is either pinned or otherwise fastened to the shaft of a constantly operated motor 91. The motor 91 is preferably a clock motor, but might be any other type of motor geared to operate a shaft at a speed of about one revolution per minute. The collar 90 is formed with a boss 93 (Fig. 3) extending upward through the plates 86 and 87 and beyond the shaft of the motor 91. A control shaft 94 has one end journalled in this boss and is also journalled in the plate 39. Fixed to the control shaft 94 by a set screw or other convenient means is a control arm 95 having a finger 96 extending downward. Between the arm 95 and the upper plate 88 is a compression spring 97 which holds the upper plate 88 in firm spring pressed engagement with the lower plate 86. A washer 98 may be provided to retain the spring 97. A spacer 99 may also be used between the arm 95 and the plate 39 if desired. It will be apparent that the lower plate 86 of the cam is positively driven by the motor 91. At the same time, because of the friction between the plates, the upper plate will rotate in unison with the lower.

It is possible, however, by this construction to change interval of time for which the picture is shown. With an eight lobed cam, it is obvious that the pictures will be changed eight times in one revolution of the motor 91, and if the motor be a clock motor, this means eight pictures per minute. However, by turning the four lobed upper plate 88 to the position shown in Fig. 10, half of the notches 89 are effectively filled, and no picture change will occur at these notches. This change of position of the upper plate may be readily accomplished by utilizing the finger 96. This finger extends downward through a hole in the upper plate 88 which just fits the finger. A slotted opening 101 in the lower plate allows the finger to move within limits. As illustrated in Figs. 7 and 10, these limits are from a position where the four lobes of the upper plate 88 coincide with four of the lower plate 86 (Fig. 7) and a second position where the four lobes of the uper plate, block four of the notches of the lower plate (Fig. 10). A knurled knob 102 (Fig. 3) fixed on the shaft 94 provides convenient means for turning this shaft separate from the motor shaft, and therefore will move the arm 95 and upper plate 88 relative to the lower. This knob is also accessible through the opening 37 in the case 10 when the lamp housing 12 is tilted back out of the way. It will be obvious that while the plates have been described as four and eight lobed, any even number of lobes could be used on the lower plate and one-half as many used on the upper plate.

The operation of the control will be clear from the above description and a reference to the wiring diagram, Fig. 13. Here a pair of wires 105 carry electrical power from a power source, not shown. As noted above, the motor 91 runs continuously and therefore is connected directly across the line. This causes a constant rotation of the cam 85. The switch 81 is preferably of the double-throw single-pole type, as noted above, and is operated by the cam. One of the throws of the switch operates the projector lamp 13. This is the throw which is closed when the roller 83 is riding on the lobes 87 of the cam 85. When the roller drops into a notch 89, the switch arm 82 moves to open the lamp circuit and close the circuit to the motor 54 which causes the slide to be changed. Thus, on automatic operation, the projection lamp is always out while the slides are changed.

In order to provide a manual remote control, a push button switch 106 may be provided to close the circuit of the motor 54. Means are then provided to prevent interference of the automatic control with the manual. This is effected by blocking the switch 81 in the position shown in Fig. 13 with the projection light on. The means to accomplish this comprise an eccentric cam 108 (Figs. 3, 7 and 13) fixed to a shaft 109 which is journalled in a sleeve 110 extending downward from the plate 39. The cam 108 is adapted to engage an upstanding finger 111 on the arm 82 of the switch and so to move the roller out of engagement with the cam 85, thus holding the switch in the desired position. A knurled knob 112 is provided to turn the shaft 109, and the limits of motion are set by the engagement of a set screw 113 in a collar 114 with either of a pair of posts 115 on the plate 39 beside the shaft 109.

Many simple variations of the wiring diagram will occur to those skilled in the art. For example, the movement of the cam 108 to block the switch 81 might also be used to open a switch in the circuit of the clock motor 91. With this arrangement, the switch 81 might be arranged to be blocked in a neutral position and a double-throw single-pole push button switch 106 be used to accomplish the same purposes as are now accomplished by the automatic control, namely, the turning out of the lamp while the slides are changing.

The projection system, in addition to the components in the lamp house 12, includes an object lens 117 slidably journalled between three posts 118 on the plate 79 (see Figs. 2, 7 and 8). Focusing adjustment of this lens is accomplished from outside the case 10 by use of a crank mechanism. The crank arm 120 is fixed to a shaft 121 terminating outside the case and provided with a knob 122 (Figs. 2 and 9). A collar 123 is clamped around the housing of the object lens 117 and is connected to the crank arm 120 by a connecting link 124. The link 124 extends through a slot 125 (Fig. 7) in the plate 79 and thus is capable of movement by the crank to adjust the position of the lens 117. Rough adjustment may be made before the collar 123 is clamped tight, and final adjustment is made by rotation of the knob 122.

As indicated by the dashed line in Fig. 2, the image is projected from the object lens 117 downward to a mirror 128 mounted on a plate 129 just inside the track members 24 at the bottom of the cabinet. The plate 129 is mounted at three points on posts 130 which may conveniently be bolts. This is a desirable construction since then the plate may be adjusted slightly to align the mirror properly.

From this mirror the image is reflected to a second mirror 132 mounted on the back 133 of the case 10. The back 133 is attached to the case by a hinge 134 along its top edge. In the position shown, extraneous light is kept out by triangular side members 135 and a bottom piece 136 which shield the opening caused by swinging the back out. The back is held in the proper tilted position for projecting by props 137 (preferably two in number) engaging the lower edge 138 of the opening in the back of the case 10. From the second mirror, the image is reflected to the screen 11 at the front of the case. A flanged knob 140 similar to the knob 17 for the lamp housing may be provided to hold the back 133 closed if desired. It will thus be seen that by hinging the back 133, several desirable results are accomplished. Included among these are: a much smaller case is provided increasing the portability of the device, and by providing the angular displacement of mirror, a longer path is provided for light rays thereby increasing the size of picture projected by the lens in the smaller size case.

It is apparent that my slide carrying chain extends completely around the maximum dimension of the case, thus allowing the greatest possible number of pictures in a continuous chain. The lamp house is atop the case, where the heat generated by the projection lamp 13 warms the air and draws it through the holes 8 from the case 10. This warmed air flows out of the perforations 9 in the lamp housing. Thus a continuous current of room air is drawn into the case 10 from around the hinged back 133 and passes over the operating mechanism, motors and the like, and also over the slide which, at the instant is being projected, as well as the adjacent slides, keeping them cool. The air then goes into the lamp housing where the lamp also is cooled by the current of air. This air current is sufficient to cool a 150 watt projector bulb which is presently contemplated. In larger sizes, however, it might be found necessary to use a fan for cooling. In either case, however, the provision of the lamp housing atop the case provides a chimney effect for the rest of the housing to cool the working mechanism and slides. In addition, the projection distance is sufficiently long to project an adequate picture on the screen and yet the case is very compact. A simplified automatic control for the slide chain is provided as well as providing for manual control.

Having thus described my invention, I am aware that numerous and extensive departures may be made therefrom without departing from the spirit or scope of my invention.

I claim:

1. A projector comprising a case, track means mounted within said case extending around the maximum peripheral distance thereof, a chain of carriers adapted to hold photograph slides, said chain of carriers being slidably disposed on said track means, lamp housing means disposed on top of said case, said lamp housing means including a lamp and condensing means adapted to project substantially parallel beams of light through said slides, object lens means slidably mounted in said case within the circumference of said track means, an adjustable mirror system mounted within said circumference adapted to lengthen and alter the path of projection, and a screen on the front of said case adapted to receive the image from said mirrors.

2. A projector comprising a case, track means mounted within said case extending around the maximum peripheral distance thereof, a chain of carriers adapted to hold photograph slides, said chain of carriers being slidably disposed on said track means, lamp housing means disposed on top of said case, said lamp housing means including a lamp and coindensing means adapted to project substantially parallel beams of light through said slides, object lens means slidably mounted in said case within the circumference of said track means, a first mirror adjustably mounted near the bottom of said case within said track, a second mirror mounted on the back of said case, said back being hinged at its upper edge to said case, prop means on said back adapted to hold said back at a predetermined angle to said case when said back is opened, and a translucent screen on the front of said case, said first mirror being tilted so as to reflect the image from said object lens means onto said second mirror, said predetermined angle of said back being such as to cause said second mirror to reflect the image from said first mirror onto said screen.

3. A projector comprising a case, track means mounted within said case around the maximum periphery thereof, a chain slidably disposed on said track, said chain comprising carrier means having cross members adapted to carry photographic slides, and linking means between said carriers to link said carriers together, said linking means having a cross member at a level nearer the center of said track than any cross member of said carrier, a projection system within said track including an object lens, mirrors and a screen to project the image from said slide onto said screen, and motive means to move said chain one step at a time including a carriage slidably mounted from said track, a pawl pivotally mounted on said carriage and having an upstanding portion adapted to engage the cross member of said linking means to pull it in one direction, said pawl being swingable into non-engaging position with the cross member when moving in the other direction, and drive means to slide said carriage reciprocally through a predetermined distance.

4. A projector comprising a case, track means mounted within said case around the maximum periphery thereof, a chain slidably disposed on said track, said chain comprising carrier means having cross members adapted to carry photographic slides, and linking means between said carriers to link said carriers together, said linking means having a cross member at a level nearer the center of said track than any cross member of said carrier, a projection system within said track including an object lens, mirrors and a screen to project the image from said slide onto said screen, and motive means to move said chain one step at a time including a carriage slidably mounted from said track, a pawl pivotally mounted on said carriage and having an upstanding portion adapted to engage the cross member of said linking means to pull it in one direction, said pawl being swingable into non-engaging position with the cross member when moving in the other direction, and drive means to slide said carriage reciprocally through a predetermined distance and timing means adapted to actuate said motive means at predetermined time intervals to change said slides automatically.

5. In a projector having a case, a projection system within said case and a track means surrounding the inside of said case; means for changing pictures to be projected comprising a chain slidably disposed on said track means, said chain composed of carrier members having cross members and linking members, said linking members having a cross part at a level nearer said track means than said carrier cross members, a slide track member suspended from said track means, a carriage slidably disposed on said track member, a pawl pivotally mounted on said carriage, said pawl being adapted to move pivotally in one direction from its normal position and not in the other, said pawl having a part in position to engage said cross part of said linking members, drive means to move said carriage in one direction, said pawl being carried into engagement with said cross part to move said chain, and return means to return said carriage to its initial position, said pawl being tilted and released by passing engagement with a second cross part and thereby being prepared for successive operation.

6. In a projector having a chain of slide carriers disposed on a chain track; means to move said chain of slide carriers step by step comprising a slide track member supported from said chain track, a carriage slidably disposed on said slide track member, an escapement pawl mounted on said carriage adapted to engage said chain of slide carriers and pull it in one direction and to slide freely past it in the other direction, a motor operably connected to said carriage to move it in one direction, resilient means engaging said carriage adapted to be stressed by movement of said carriage by the motor, said resilient means being adapted thereby to return said carriage in the opposite direction, switch means connected to said motor to control the operation thereof, and driven cam means engaging said switch means to turn it off and on at spaced intervals of time.

7. In a projector having a chain of slide carriers disposed on a chain track; means to move said chain of slide carriers step by step on said track comprising sliding escapement means adapted to engage said chain of slide carriers to pull it in one direction and to be tripped by engagement with said chain of slide carriers when relative motion is in the opposite direction, a motor, pulley means in driven connection with said motor, said pulley means being capable of slippage relative to said motor if overloaded, connecting means between said pulley and said escapement means whereby said escapement means is pulled by said motor as said motor is energized, and resilient means engaged with said escapement means to return it to the initial position when said motor is de-energized.

8. In a projector having a chain of slide carriers disposed on a chain track; means to move said chain of slide carriers step by step on said track comprising sliding escapement means adapted to engage said chain of slide carriers to pull it in one direction and to be tripped by engagement with said chain of slide carriers when relative motion is in the opposite direction, a motor, pulley means in driven connection with said motor, said pulley means being capable of slippage relative to said motor if overloaded, connecting means between said pulley and said escapement means whereby said escapement means is pulled by said motor as said motor is energized, and resilient means engaged with said escapement means to return it to the initial position when said motor is de-energized, switch means adapted to control said motor, rotary cam means adapted to engage said switch means, and continuously driven means carrying said cam means whereby said cam means turns said switch means off and on at spaced time intervals to move said chain intermittently.

9. In a projector having a chain of slide carriers slidably disposed on a chain track; means to move said chain of slide carriers step-by-step on said track comprising sliding escapement means adapted to engage said chain of slide carriers to pull it in one direction and to be tripped and therefore slide past said chain of slide carriers in the opposite direction, a motor, a pulley driven by said motor, said pulley being adapted to slip relative to said motor if overloaded, adjustment means for said pulley adapted to adjust the point of overload where slippage begins, connecting means between said pulley and said escapement means, adjustable stop means for said escapement means to assure proper placement of said chain of slide carriers, said slippage of said pulley thereby protecting said motor from stalling as said escapement means is stopped, and return means on said escapement means adapted to return it to its original position when said motor is de-energized.

10. In a projector having a chain of slide carriers slidably disposed on a chain track, and escapement means to move said chain in a step-by-step movement; drive means for said escapement comprising a motor, a driven shaft, an overrunning clutch engaged between said motor and said shaft, a pulley journalled on said shaft, a washer keyed to said shaft at each end of said pulley, means on said shaft to prevent longitudinal movement of one of said washers, adjustable means on said shaft near the other of said washers, resilient means engaged between said adjustable means and said washer whereby the frictional engagement between said washers and said pulley may be adjusted, and connecting means on said pulley adapted to pull said escapement means.

11. In a projector having a chain track and a chain of slide carriers slidably disposed thereon; means to move said chain intermittently comprising a plate supported from said chain track and formed to provide slide tracks, a carriage slidably disposed on said slide tracks, an escapement pawl on said carriage adapted to engage and pull said chain as said carriage is moved in one direction, and to slide past said chain as said carriage is moved in the other direction, a drive motor, a gear train driven by said motor, a shaft, an over-running clutch engaged between said motor and said shaft, a pulley on said shaft, adjustable slippage means engaged between said pulley and said shaft adapted to allow said pulley to slip if overloaded, connecting means between said carriage and said pulley whereby said motor is adapted to drive said carriage in one direction, and resilient means connected to said carriage to move it in the opposite direction when said motor is de-energized.

12. In a projector having a chain track and a chain of slide carriers slidably disposed thereon; means to move said chain intermittently comprising a plate supported from said chain track and formed to provide slide tracks, a carriage slidably disposed on said slide tracks, an escapement pawl on said carriage adapted to engage and pull said chain as said carriage is moved in one direction, and to slide past said chain as said carriage is moved in the other direction, a drive motor, a gear train driven by said motor, a shaft, an over-running clutch engaged between said motor and said shaft, a pulley on said shaft, adjustable slippage means engaged between said pulley and said shaft adapted to allow said pulley to slip if overloaded, connecting means between said carriage and said pulley whereby said motor is adapted to drive said carriage in one direction, and resilient means connected to said carriage to move it in the opposite direction when said motor is de-energized, a mounting plate also supported from said chain track, a switch of said mounting plate in circuit with said motor, said switch having an operating member, a follower on said operating member, a cam adjacent said follower adapted to engage said follower to move said operating member and a constantly driven motor driving said cam whereby said drive motor is intermittently energized and de-energized.

13. A projector comprising a case, a chain track mounted within said case extending adjacent the inner periphery thereof, a chain of slide carriers slidably disposed on said track, a lamp housing enclosing a lamp and a condensing lens system mounted above said case and adapted to project a beam of light through a slide on one of said slide carriers, a plate supported on said chain track, said plate being formed to provide slide tracks thereon, carriage means slidably disposed on said slide tracks, an escapement pawl on said carriage adapted to engage said chain to pull it as said carriage is moved in one direction and to slide past said chain as said carriage is moved in the opposite direction, a motor supported from said plate, a shaft, over-running clutch means between said shaft and said motor to drive said shaft, a pulley journalled on said shaft, adjustable clutch means between said shaft and said pulley to allow said shaft to rotate if said pulley is overloaded, connecting means between said pulley and said carriage means whereby said motor is adapted to drive said carriage in one direction, resilient means engaged with said carriage adapted to return said carriage after said motor has been de-energized, a mounting plate supported from said first named plate, a switch means mounted on said mounting plate in electrical circuit with said motor and said lamp, said switch means being arranged so that when said lamp is on said motor is off and when said motor is on said lamp is off, an operating arm on said switch means, a follower on said operating arm, a multi-lobed cam adjacent said follower adapted to engage said follower to operate said switch, said cam being formed of a plurality of cam plates, at least one of said cam plates being movable to adjust the width of said lobes, a continuously driven motor in driving engagement with said cam to rotate said cam at substantially constant speed, said adjustment of said cam being thereby effective to adjust the time intervals between operations of said switch, a finger on said arm, an eccentric cam adjacent said finger, said eccentric cam being manually operable, said cam being positioned to be adapted to engage said finger to block said switch with the lamp on, manually operable switch means in the circuit of said drive motor to allow manual operation of said motor, an object lens system slidably journalled in said mounting plate, adjustment means connected to said object lens, said adjustment means extending outside the case to allow focusing of said lens, a first mirror mounted within said chain track, a hinged back on said case, a second mirror mounted on said back, prop means on said back engageable with said case to hold said back at an angle thereto, a screen mounted in the front of said case, said mirrors being tilted at an angle to reflect an image from said object lens onto said screen.

14. A slide projection system comprising a casing, an endless slide chain and track means therefor extending around the casing close to the periphery thereof, said casing being provided with a top opening and means for supporting said chain for movement closely adjacent to and past said top opening, a projection system including an objective lens system and reflecting mirrors disposed within the casing and within the boundaries of a plane defined by said chain, a lamp housing hingedly connected to the top of said housing including a light source and condensing lens system, means for locking said lamp housing to said casing, said hinge for said lamp housing arranged to enable the housing to be raised from over said opening and said opening providing access to said slide chain to enable installation and removal of slides therefrom.

15. A control system, for a slide projector having a drive motor adapted to change slides and a projection lamp, comprising a continuously driven geared motor, a cam driven by said geared motor, a switch having an operating arm, a follower on said arm in engagement with said cam, said switch being of the double throw type, said arm being movable to close the contacts of one throw as those of the other are separated, said cam being formed to cause said arm to alternately close and open the contacts of said switch, the contacts of one of said throws being connected to said lamp, and the other to said motor whereby said lamp is turned off as said motor is operated, and said motor is off when said lamp is on, said cam comprising a multi-lobed cam formed of a plurality of plates, at least one of which is movable relative to the other to adjust the width of the lobes whereby the time interval of certain operations may be varied.

16. A control system, for a slide projector having a drive motor adapted to change slides and a projection lamp, comprising a continuously driven geared motor, a cam driven by said geared motor, a switch having an operating arm, a follower on said arm in engagement with said cam, said switch being of the double throw type, said arm being movable to close the contacts of one throw as those of the other are separated, said cam being formed to cause said arm to alternately close and open the contacts of said switch, the contacts of one of said throws being connected to said lamp, and the other to said motor whereby said lamp is turned off as said motor is operated, and said motor is off when said lamp is on said operating arm bearing a finger, an eccentric cam adjacent said finger adapted to engage said finger and thereby move said arm out of control of said first named cam, said switch being arranged to be thereby blocked with said lamp on, and an external manually operated switch in circuit with said motor to cause said motor to change slides by manual operation.

References Cited in the file of this patent

UNITED STATES PATENTS

| 992,366 | Mack et al. | May 16, 1911 |
| 1,028,692 | Dusseris et al. | June 4, 1912 |
| 1,178,786 | Dunham | Apr. 11, 1916 |
| 1,590,704 | Semelroth | June 29, 1926 |
| 1,856,234 | Birdsall | May 3, 1932 |
| 2,003,480 | De Vry | June 4, 1935 |
| 2,007,561 | Conn | June 9, 1935 |
| 2,391,879 | Chambers | Jan. 1, 1946 |
| 2,431,662 | Ralph | Nov. 25, 1947 |
| 2,481,850 | Linder | Sept. 13, 1949 |
| 2,586,176 | Olsen | Feb. 19, 1952 |

FOREIGN PATENTS

| 691,545 | France | July 15, 1930 |